May 25, 1965  O. G. LEWIS ETAL  3,184,956
FUEL RATINGS

Filed Dec. 31, 1962  4 Sheets-Sheet 1

OLIVER G. LEWIS
HERBERT R. JACOBUS   Inventors

By  Cecil C. Schmidt

Patent Agent

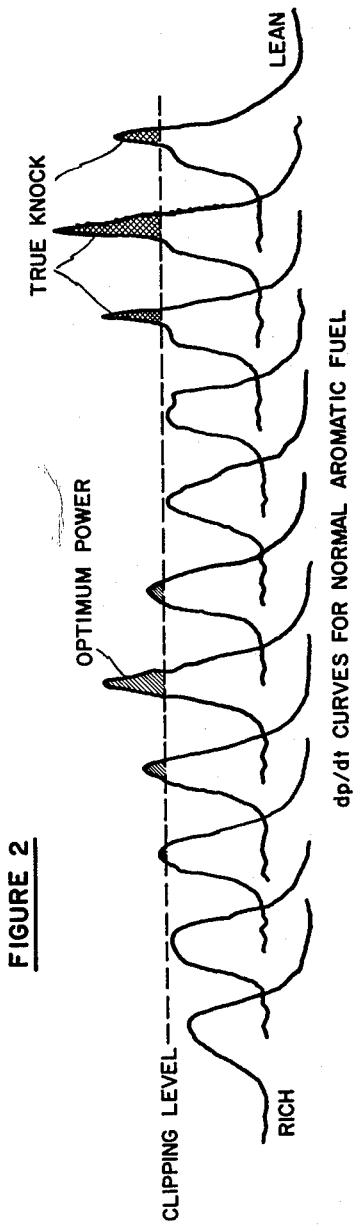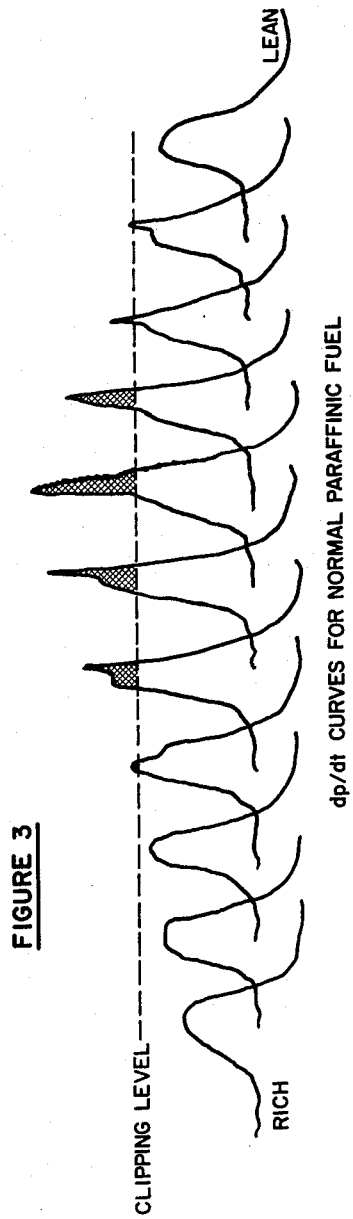

May 25, 1965 O. G. LEWIS ETAL 3,184,956
FUEL RATINGS
Filed Dec. 31, 1962 4 Sheets-Sheet 3

OLIVER G. LEWIS
HERBERT R. JACOBUS   Inventors

By   Cecil C. Schmidt
Patent Agent

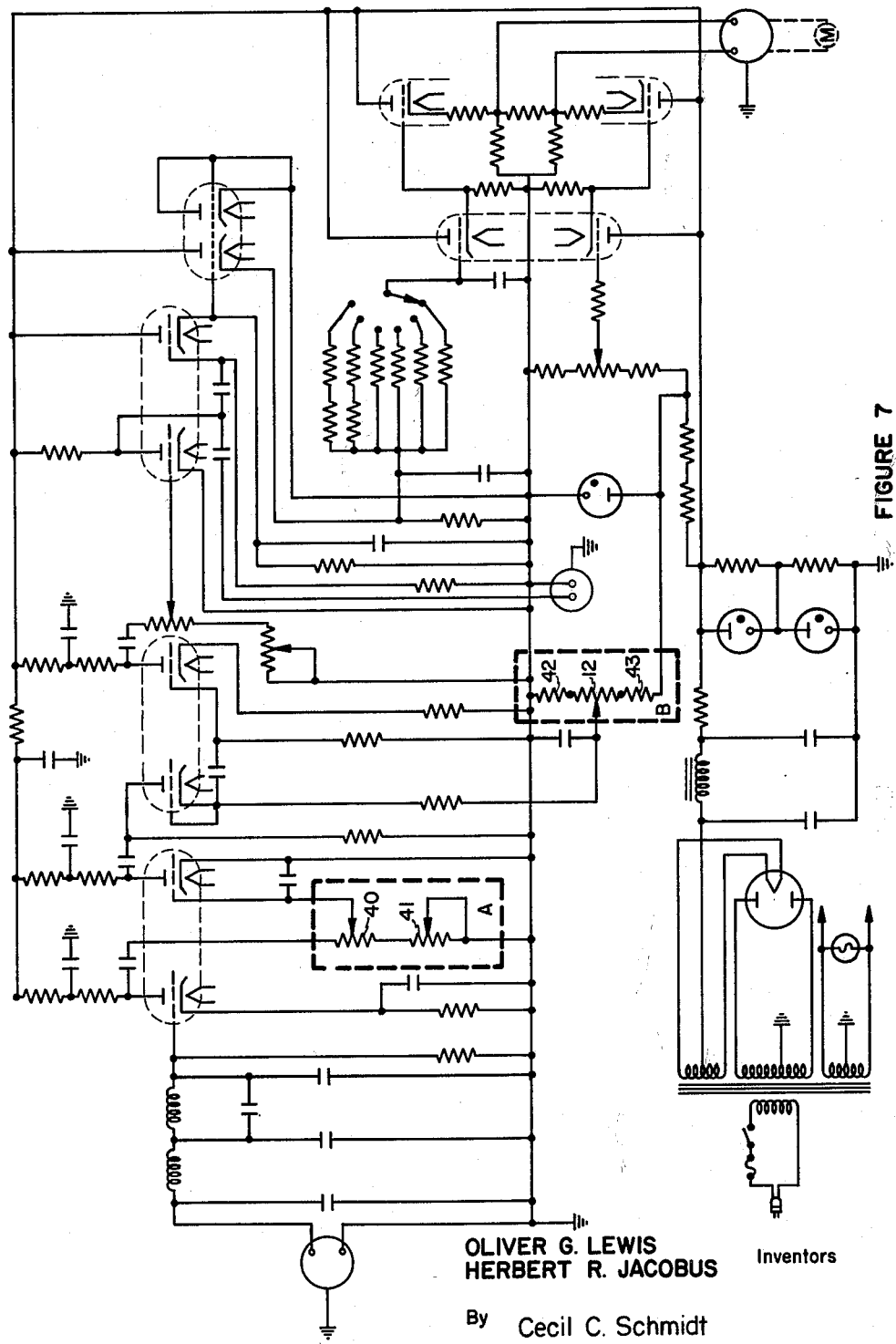

United States Patent Office 3,184,956
Patented May 25, 1965

3,184,956
FUEL RATINGS
Oliver G. Lewis, Westfield, and Herbert R. Jacobus, Cranford, N.J., assignors to Esso Research and Engineering Company, a corporation of Delaware
Filed Dec. 31, 1962, Ser. No. 248,436
3 Claims. (Cl. 73—35)

The present invention relates to an improved method and apparatus for rating fuels. In particular, this invention relates to an improved clipping circuit for use in combination with electronic detonation meter (knockmeter) used for rating motor fuels according to the ASTM Research and Motor Methods. The apparatus of the present invention is particularly suited for use with what is commonly referred to as the Phillips Knockmeter.

The present invention substantially resides in the combination, construction, arrangement, use and function of the various components, all of which are hereinafter described. The invention will be more clearly understood by reference to the following detailed description taken in cooperation with the drawings, in which:

FIGURE 2 is a graphical representation of $dp/dt$ combustion curves for an aromatic fuel.

FIGURE 3 is a graphical representation of $dp/dt$ combustion curves for a paraffinic fuel.

FIGURE 7 is a wiring diagram of a commercially available detonation meter which has been modified according to the present invention.

The ASTM methods for rating motor fuels, which are the industry standards, are completely described in The ASTM Manual for Rating Fuels by Motor and Research Methods, 4th edition, 1960, published by the American Society for Testing Materials, 1916 Race Street, Philadelphia 3, Pennsylvania. These ASTM methods are well known to those skilled in the art. For convenience, however, they are hereinafter described.

Briefly, these methods are industry accepted techniques used to determine the octane number of a motor fuel. The two tests (Research and Motor) are similar and differ only with respect to operating conditions. They both employ a test engine commonly referred to as a CFR (Coordinating Fuel Research) knock motor. The octane number determined according to those methods is an indicia of the quality of the motor fuel being tested, i.e., the higher the octane number the better the fuel.

The CFR knock motor is a single cylinder engine of continuously variable compression ratio. The compression ratio is a function of the cylinder position with respect to the piston and can be varied by changing the position of the cylinder head. Attached to the combustion chamber of the CFR knock motor is a pressure sensitive device which is capable of converting variations in pressure within the combustion chamber to a proportional electrical signal. A number of these pressure sensitive devices are commercially available. A satisfactory device of this type is the Model D-1 pick-up of the Lane-Wells Company, Los Angeles, California. The voltage output of this pressure sensitive device is substantially proportional to the rate of change of pressure ($dp/dt$) within the combustion chamber. The variations in electrical signal produced by the pressure sensitive device are modified in a predetermined manner and transmitted to a meter. The meter, pick-up, and signal modification equipment are generally referred to as a detonation meter.

Figure 1:
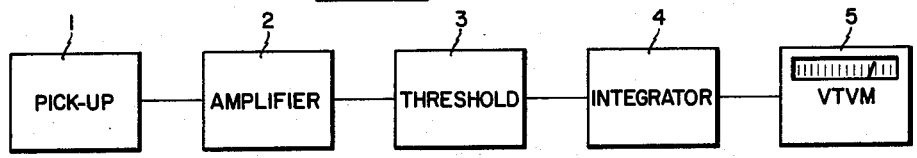
FIGURE 1 is a block diagram of the elements of a conventional detonation meter.

In this regard, see U.S. Patent No. 2,534,005. While the detonation meter shown in FIGURE 1 has been divided into five elements, it should be realized that the line of demarcation between these elements is indefinite and the wiring diagram of FIGURE 7 is a more realistic representation. In FIGURE 1, a pick-up 1, mounted on a knock motor (not shown), generates a signal which is amplified by amplifier 2. The output of amplifier 2 is applied to threshold 3 which eliminates (clips) the signals coming from amplifier 2 falling below a predetermined, but adjustable, threshold value. The clipped signals then pass from threshold 3 to integrator 4 wherein they are amplified, rectified and integrated. The output of integrator 4 is then passed to voltage measuring or indicating means 5, which is usually a vacuum tube voltmeter. The meter 5 offers a visual indication of the level of knock intensity of the fuel based upon the changing pressure within the engine combustion chamber.

Under some conditions the unignited mixture of fuel and air within the cylinder of the CFR test engine will ignite spontaneously instead of burning smoothly along the flame front (which is progressing across the combustion chamber from the spark where it has been intentionally ignited). This spontaneous ignition may cause detonation or as it is more frequently called knocking and can be observed as an abnormal rise in combustion pressure. This tendency of a fuel to knock increases with increasing engine compression ratios. Thus a fuel which knocks in the CFR test engine at a compression ratio of 9.5 to 1 may perform satisfactorily at a compression ratio of say 8.0 to 1.

In determining the octane number of an unknown fuel, a sample of the unknown fuel is fed into the CFR test engine while varying the compression ratio of the engine to obtain the standard level of knock intensity as determined by a predetermined guide curve (see the previously referred to ASTM publication for elaboration as regards the guide curve). All knock ratings are made at approximately the same level of knock intensity. Once the standard level of knock intensity has been reached for the unknown sample, the procedure is repeated to achieve the same level of knock intensity with a blend of reference fuels. All knock ratings, made for the reference fuel blend, are made at fuel to air ratios giving the maximum knock intensity (as shown by the visual knockmeter indication). This fuel to air ratio may be adjusted by raising or lowering the fuel level in the carburetor bowl. When the knock intensity of the known or reference fuel blend matches the knock intensity of the unknown fuel, it can then be said that the unknown fuel has the same octane rating as the reference mixture. For octane numbers below 100, normal heptane has been assigned on octane number of 0 because of its low suitability as a fuel (high knock characteristics). Isooctane (2,2,4-trimethylpentane) has been assigned an octane number of 100 because of its outstanding anti-knock characteristics. By definition, the octane number of a motor fuel having an octane number below 100 is expressed as a percentage by volume of isooctane in a blend of isooctane and normal heptane having equivalent knocking characteristics, i.e., if a reference fuel having the same knocking characteristics as an unknown fuel consists of 75 vol. percent isooctane and 25 vol. percent normal heptane, then the octane number of the unknown fuel would be 75.

In determining octane numbers above 100 (which has become necessary with the advent of high compression engines) a blend of isooctane and tetraethyl lead is used as the reference fuel. This blend of isooctane and tetraethyl lead has an octane relationship as described in Table 7, page 32, of the previously described ASTM publication.

As previously described, the meter 5 gives a visual indication of the level of knock intensity of a particular fuel being tested. It is controlled in part by means of a fixed level clipping circuit (threshold 3 of FIGURE 1) which clips or suppresses the electrical signal from pressure sensitive device 1 attached to the knock motor (not shown) and allows the meter 5 to indicate an approximate mid-scale reading with some relatively standard degree of knocking intensity. This means, in effect, that the only electrical signals which can be read by the meter 5 are those which exceed the predetermined level of this fixed clipping circuit (threshold 3).

It has now been found, and this finding forms the basis of the present invention, that the fixed level clipping circuit presently used by the industry in cooperation with the ASTM knockmeter does not, in many instances, allow accurate knock ratings to be obtained. This phenomena may be attributed to several factors. One is that when high power fuels are being tested the knockmeter will read the normal high combustion pressures as well as the abnormal knocking pressures. As a result, some non-knocking fuels will give knockmeter readings of apparent standard knock intensity because of high combustion pressures which are not eliminated by the fixed level clipping circuit. This misleading knockmeter reading will cause the operator of the knock motor to conclude erroneously that the fuel has a lower octane rating (higher knock tendency) than is actually true. This phenomena is particularly pronounced with aromatic fuels or fuels containing aromatic compounds which have a high burning or combustion rate. This seems to stem from the fact that the optimum power is generated at fuel to air ratios which are different from the fuel to air ratios under maximum knocking conditions. Thus the knockmeter gives two readings of substantially the same level of knock intensity but at different compression and fuel to air ratios (see FIGURE 2). For non-aromatic, e.g., paraffinic, fuels the problem is not as acute since in this type of fuel the maximum knock occurs at very nearly the same fuel to air ratio (also compression ratio) as does maximum power. Thus the two pressure peaks coincide for practical purposes and no appreciable error is noted (see FIGURE 3).

According to the present invention, the clipping level of the knockmeter (detonation meter) clipping circuit is continuously and automatically adjusted so that no false readings are given. There is, therefore, only one knockmeter indication of standard knock intensity which appears while testing a given fuel. By so adjusting the clipping level, the pressure peaks corresponding to maximum power may be eliminated.

Figure 4:
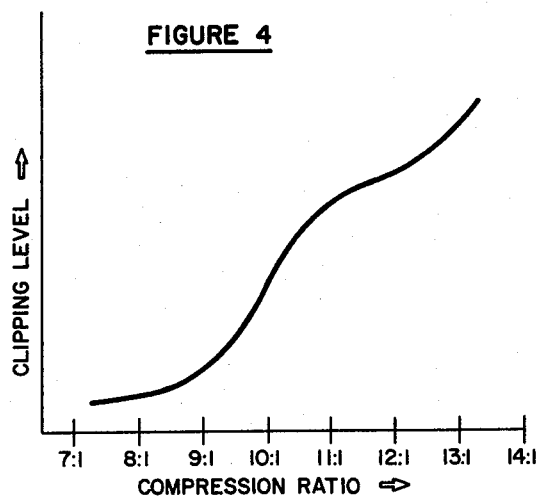
FIGURE 4 is a graphical representation of the required clipping level of the detonation meter as a function of compression ratio. The arrows indicate the directions of increasing values.

The desired clipping level of the detonation meter may be obtained for a specific test engine/detonation meter combination by utilizing a dual beam oscilloscope in connection with the pressure transducer (pick-up 1 of FIGURE 1). For example, it has been found that a guide curve developed for a specific engine by so evaluating a wide variety of fuels from 80 to 120 octane number (at just under knock limited compression ratios) would apply quite well to all types of fuels, whether totally aromatic or paraffinic. Following this guide curve (which is generally illustrated in FIGURE 4) it was possible to extend the linear portion of the combustion ratio sensitivity curve from 103.5 to slightly above 108 octane number. It must be recognized, however, that this guide curve is often affected by changes in the various components and operating conditions. For example, it was found that the placement of pick-up units around the seemingly symmetrical cylinder of the test engine gave quite different sensitivities, even wth the same pick-up unit.

FIGURE 4 illustrates, in general, the clipping level (voltage suppression) required to just suppress the electrical signal corresponding to all normal combustion pressures generated within the test engine. It can be seen that this required clipping level varies as a function of the compression ratio of the engine. Thus, it must be realized that the shape of the guide curve shown in FIGURE 4 is not intended to portray the guide curve of all test engines. The guide curve for each individual engine must be carefully determined and then utilized according to the teaching of the present invention.

Having determined the required clipping level of the detonation meter as a function of compression ratio (for a specific engine), it is necessary to provide some means for continuously and automatically translating changes of the compression ratio of the test engine into a nonlinear signal which can effectively provide the required clipping level.

One technique for accomplishing the present invention involves continuously transmitting changes in the relative height of the cylinder of the CFR test engine into a nonlinear movement of a potentiometer. Since the height of the cylinder head is a function of the compression ratio, it can be seen that this movement of the potentiometer will also bear a direct relationship to the compression ratio. The output of the potentiometer can be controlled, directly or indirectly, to just suppress the knockmeter reading to zero on a non-knocking fuel running at the maximum power at any given compression ratio.

Figure 5:
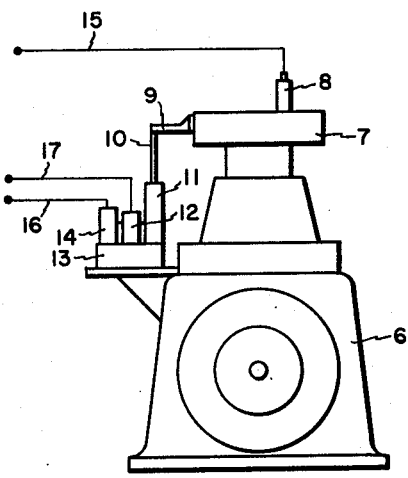
FIGURE 5 is a front elevation of a suitable arrangement of the various components of an embodiment of the present invention shown in relationship to the conventional CFR test engine.

Referring now to FIGURE 5, a CFR test engine 6 having a variable compression ratio cylinder and valve assembly 7 and pressure sensitive pick-up 8 is modified by mounting an arm 9 to the cylinder and valve assembly 7. Arm 9 carries the core assembly 10 of a differential transformer 11. Differential transformer 11 (e.g., Model No. 6205 manufactured by Automatic Timing and Controls, Inc., King of Prussia, Pennsylvania) is mounted adjacent to potentiometer 12 and over gear box 13 and close to motor 14 (e.g., Model No. 6171 manufactured by Automatic Timing and Controls, Inc.). The signal generated by pick-up 8 is fed to a detonation meter (not shown) via line 15. A source of power is provided for motor 14 through line 16. Output line 17 carries the variable signal of potentiometer 12. This output is used to automatically adjust the clipping level of the detonation meter so as to just suppress all signals corresponding to normal combustion.

Figure 6:
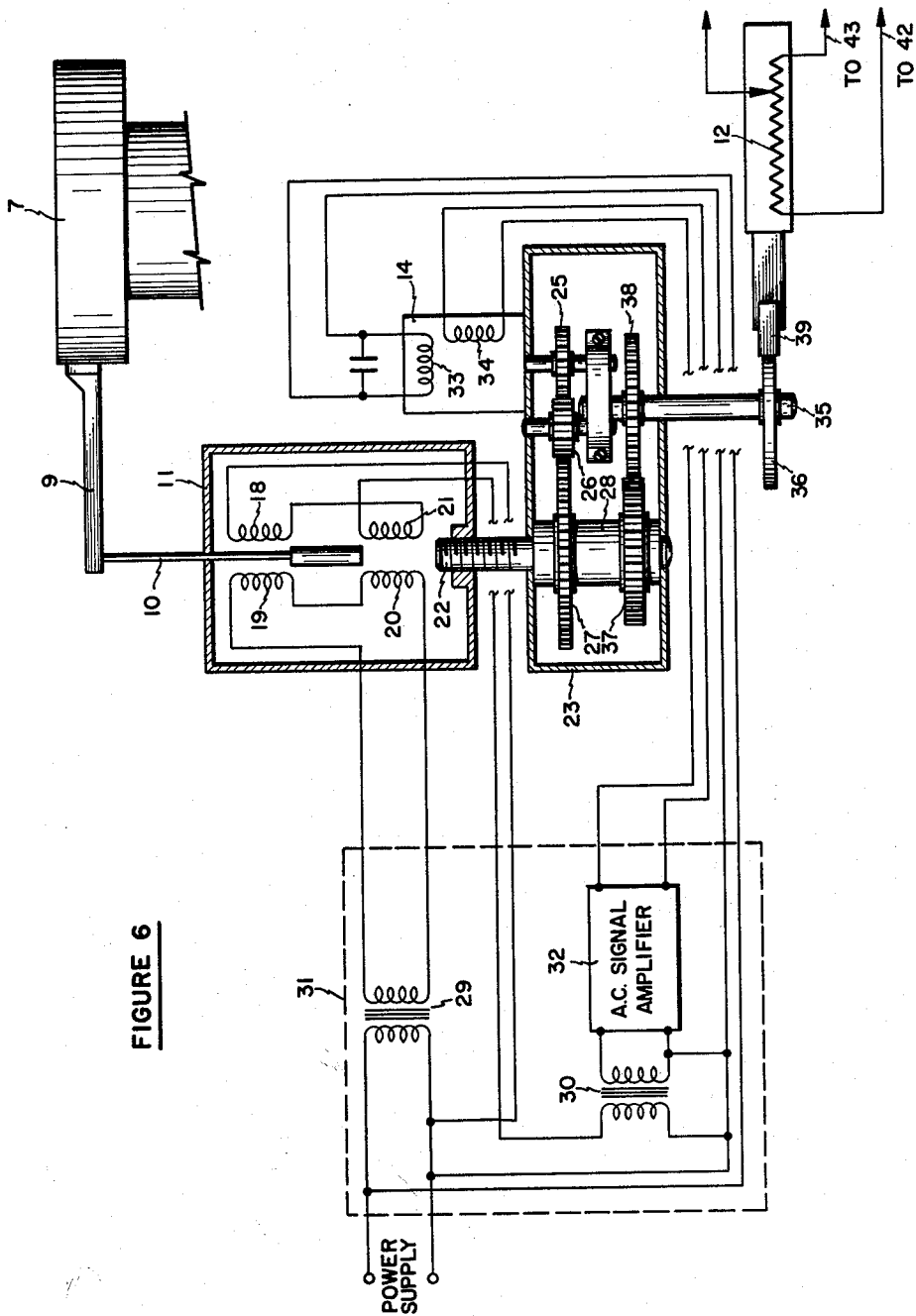
FIGURE 6 is a diagrammatic representation of one form of the improved apparatus shown in FIGURE 5.

The apparatus of FIGURE 5, which is a preferred embodiment of the present invention, is illustrated in detail in FIGURE 6. Cylinder and valve assembly 7 with its ability to move upward and downward with respect to the base of the CFR test engine (not shown) has attached to it an arm 9 carrying the core assembly 10 of differential transformer 11. The differential transformer 11, comprised of coils 18, 19, 20, 21, is supported by elevating screw 22 and gear box 23. The elevation of the differential transformer 11 with respect to the CFR test engine base (not shown) and gear box 23 may be changed by the action of motor 14 through gear train 25, 26, 27, lead nut 28, and elevating or lead screw 22.

Movement of the cylinder and valve assembly 7 with respect to the base of the CFR test engine (not shown) moves core assembly 10 within differential transformer 11. This movement of core assembly 10 generates an electrical unbalance of coils 18, 19, 20, 21, within the differential transformer 11. Note that coils 19 and 20 are constantly energized with alternating current by means of the secondary output of transformer 29. The secondary coils 18 and 21 of differential transformer 11 are connected so that their output voltages are 180° out of phase and the armature or core 10 is located so that it can alter the relative flux distribution which exists between the two primary coils 19 and 20 and the two secondary coils 18 and 21. The electrical unbalance or phase change, caused by the movement of core assembly 10, results in an increased output of one phase or the other with the displacement of core assembly 10 from a central or null position. This electrical output passes through current transformer 30 located within the amplifier chassis 31 (e.g., Model No. 6251-A manufactured by Automatic Timing and Controls, Inc.) of differential transformer 11. This signal is then fed into signal amplifier 32. The output of amplifier 32 causes coils 33 and 34 to drive motor 14 in the proper direction to move the differential transformer 11 upwardly or downwardly into a null position around core assembly 10. This is accomplished by the action of lead screw 22 and gear train 25, 26, 27 within gear box 23. Thus any new position taken by core assembly 10 (corresponding to a change in engine compression ratio) will cause motor 14 to adjust the position of differential transformer 11 about core assembly 10 until the output of the differential transformer 11 is again zero, thus indicating that a null position has been obtained. Within gear box 23 is a separate shaft 35 (not fixed to gear 26) which carries an irregularly surfaced cam 36. Since there is a definite gear engagement between gears 37 and 38, there will be a definite angular position of cam 36 with respect to the elevation or depression of differential transformer 11. Thus an angular relationship is determined which varies with the compression ratio of the test engine. As cam 36 turns on its axis with shaft 35, its developed surface will cause a movement of slider 39 of linear potentiometer 12. Thus it can be seen that a change in compression ratio of the CFR test engine (not shown) will cause a non-linear change in the output of linear potentiometer 12. The output of linear potentiometer 12 can be preselected for a given compression ratio by suitably designing the outer developed surface of cam 36. The output of linear potentiometer 12 can thus be adjusted so as to provide a variable, but predetermined, clipping circuit (e.g., applied to the detonation meter as shown in FIGURE 7 and as hereinafter described).

The apparatus shown in FIGURES 5 and 6 has been constructed using the commercially available components previously indicated and proved quite successful.

The output of potentiometer 12 (FIGURE 6) may be introduced into the circuitry of a detonation meter such as that described in FIGURE 1 at any one of several points. One method of introduction is to introduce the signal generated by linear potentiometer 12 into amplifier 2 of FIGURE 1 as a gain attenuation. In this instance the gain must be reduced since the rate of pressure increases with compression ratio. This reduction in gain is necessary to keep the peak output values of amplifier 2 below the fixed clipping level of threshold amplifier 3 of FIGURE 1. Introduction of the signal into amplifier 2 entails attenuation of a high impedance A.C. signal which, unless properly handled, may introduce noise within the circuit. A more desirable method of introducing this signal is to use it to raise the voltage bias on threshold amplifier 3 of FIGURE 1. In this instance attenuation is of a low impedance D.C. reference voltage. In this instance the voltage suppression (clipping level) is raised as the compression ratio is increased so that the clipping level will be kept just above the signals caused by normal combustion pressures. Utilization of the output signal of potentiometer 12 may be best understood by reference to FIGURE 7 which is a slightly modified wiring diagram of a commercially available detonation meter, Model 501-A, manufactured by Waukesha Motor Company, Waukesha, Wisconsin. In using the non-linear output of potentiometer 12 as a gain attenuation in amplifier 2, the manually controlled potentiometer of FIGURE 7 (variable resistors 40 and 41 within block A) is replaced by the non-linear signal. Specifically, resistors 40 and 41 are replaced by potentiometer 12 (e.g., a 1 megohm Markite Potentiometer Type 3210 manufactured by the Markite Corporation, New York, New York). More preferably, potentiometer 12 replaces several resistors (not shown) within block B of FIGURE 7 as indicated. According to this latter modification, several resistors (not shown) of the conventional circuit (block B) are replaced by potentiometer 12 (e.g., a 100K ohm Markite potentiometer, Type 3210) flanked by resistors 42 and 43 (e.g., 22K ohms and 3.5K ohms, respectively). Potentiometer 12 is in turn driven by a non-linear cam as previously described with particular reference to FIGURE 6. This creates a variable clipping level within threshold amplifier 3. As an alternate to using cam 36 of FIGURE 6, an individually designed non-linear potentiometer may be directly geared to shaft 35 and, through its non-linear design, produce the desired non-linear output which can be used to automatically and continuously vary the clipping level.

Figure 8:
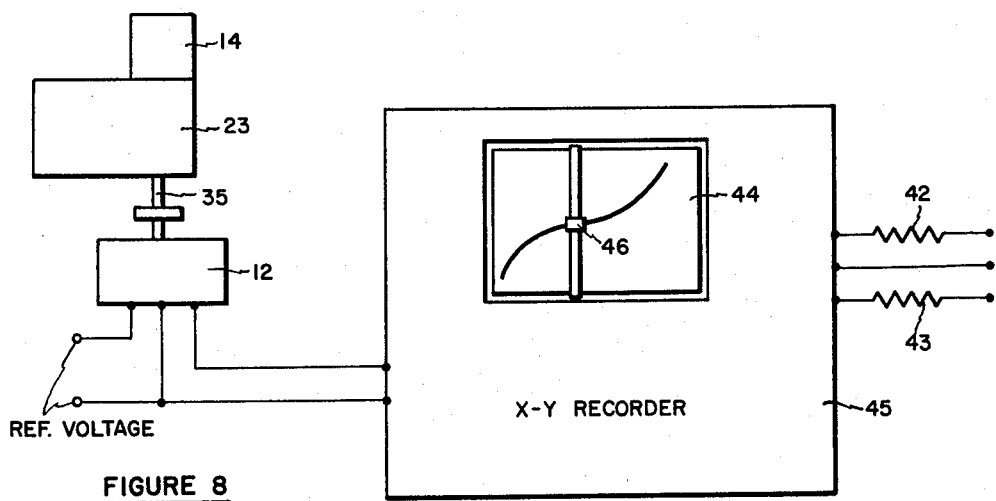
FIGURE 8 is a block diagram in partly schematic form of a curve-following method for generating the desired non-linear function.

In another embodiment as shown in FIGURE 8, shaft 35 may be connected directly to linear potentiometer 12 and the potentiometer output fed into the x axis of a curve following X-Y recorder (e.g., Moseley Autograf manufactured by F. L. Moseley Co., Pasadena, California). Here a predetermined guide curve such as the one shown in FIGURE 4 is drawn upon chart 44 of a curve following recorder 45 as shown in FIGURE 8, with conductive ink and the ink is energized by a high frequency current. The stylus 46 of the curve following recorder 45 includes a pick-up coil (not shown) which senses the magnetic field radiating from the conductive ink of guide curve 44. A D.C. signal generated by the detector portion of the curve follower is fed to drive the pen servo mechanism (not shown) so as to continuously position stylus 46 over the curve. The pen servo also drives an internally located potentiometer (not shown) which supplies the desired non-linear output signal.

The output obtained from the curve following device may be utilized in a conventional detonation meter in the same manner as previously described with reference to block B, of FIGURE 7.

By use of the invention herein described, it is possible to obtain a more repeatable and reliable level of knock intensity. Since the true knock intensity (for aromatic fuels) corresponds to a higher octane rating, it will be possible to market lower octane rated fuels as determined by this method and still maintain the present degree of customer satisfaction. This is because the standard deviation (improved precision) would allow a decrease in the average octane number without sacrificing target blends of motor fuels. The savings which can be recognized through improved laboratory test methods such as this have been appreciated for some considerable time. Detailed analyses of the savings that can be obtained through improved knock test methods were given in a paper presented by W. E. Morris to the session on Motor Fuel Combustion during the 27th Mid-year meeting of the American Petroleum Institutes Division of Refining in the Fairmount Hotel, San Francisco, California, May 16, 1962. The title of the paper is "Savings Through Improved Laboratory Knock Test Methods."

Having described the present invention with a certain degree of particularity, it will be realized that numerous modifications and adaptations may be made within the spirit and scope of the invention as hereinafter claimed.

What is claimed is:

1. In a detonation meter associated with a knock motor of variable compression ratio, said detonation meter having means for converting normal and abnormal pressure variations within said knock motor into electrical signals, means for eliminating electrical signals below a fixed predetermined level, and means for measuring electrical signals above said fixed predetermined level, the improvement which comprises in combination:

(a) a differential transformer having multiple coils and a core adjustable in and out of a null position by physical movement.
   (b) means for automatically moving said core out of said null position when the compression ratio of said knock motor is changed,
   (c) automatic means for establishing a new null position for said core and said transformer when said core is moved out of said null position, (d) means for automatically changing said predetermined level in response to changes in said null position whereby changing the compression ratio of said knock motor automatically changes the level for eliminating signals in a predetermined variable manner thus eliminating electrical signals corresponding to normal pressure variations within said knock motor.

2. The improved detonation meter as defined in claim 1 wherein the means for automatically changing said predetermined level comprises, in combination:

(a) cam means including a cam having a developed surface rotating in response to changes in said null position, (b) output means including a linear potentiometer driven by said developed surface of said cam, thereby producing a predetermined variable output, which output changes the level for eliminating signals.

3. The improved detonation meter as defined in claim 1 wherein the means for automatically changing said predetermined level comprises non-linear output means including a non-linear potentiometer, said non-linear potentiometer having an output responsive to changes in said null position, which output changes the level for eliminating signals.

References Cited by the Examiner
UNITED STATES PATENTS

| | | | |
|---|---|---|---|
| 2,416,614 | 2/47 | Crossley et al. | 73—35 |
| 2,448,323 | 8/48 | de Boisblanc | 73—35 |
| 2,475,377 | 7/49 | de Bruin | 73—35 |
| 2,670,724 | 3/54 | Reggio | 123—48 |

OTHER REFERENCES

"New Data on Automotive Combustion," National Bureau of Standards Technical News Bulletin, volume 37, No. 8; August 1953, pages 113 to 116.

RICHARD C. QUEISSER, *Primary Examiner*.